US012794695B2

(12) United States Patent
Rajaraman et al.

(10) Patent No.: US 12,794,695 B2
(45) Date of Patent: Nov. 10, 2026

(54) ENCRYPTION-AWARE VERIFICATION TOKENS FOR USE IN A DECENTRALIZED DATA SYSTEM

(71) Applicant: BANK OF AMERICA CORPORATION, Charlotte, NC (US)

(72) Inventors: Manikandan Rajaraman, Chennai (IN); Sakshi Bakshi, New Delhi (IN); Saravanan Balasubramanian, Chennai (IN); Jayakumar Manokaran, Chennai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 115 days.

(21) Appl. No.: 18/643,503

(22) Filed: Apr. 23, 2024

(65) Prior Publication Data

US 2025/0330320 A1 Oct. 23, 2025

(51) Int. Cl.
*H04L 29/06* (2006.01)
*H04L 9/32* (2006.01)

(52) U.S. Cl.
CPC .......... *H04L 9/3213* (2013.01); *H04L 9/3247* (2013.01)

(58) Field of Classification Search
CPC ................. H04L 9/3213; H04L 9/3247; H04L 12/40104; H04L 12/417; H04L 63/045; H04L 63/0457; H04L 63/0471; H04L 63/0478; H04L 63/12; H04L 63/061; H04L 63/062; H04L 2209/26; H04L 9/3234; H04L 9/3249; H04L 9/3252; H04L 9/006; H04L 9/08; H04L 9/0816; H04L 9/0819; H04L 9/0838; H04L 9/30; H04L 9/3006; H04L 9/32; H04L 9/3228; H04L 2012/6451; H04M 15/8221; H04M 2203/4545; H04M 2215/7826; H04M 2215/0156; H04N 21/26606; H04N 21/4623; H04N 1/32272; H04N 1/4486; H04N 21/2351; H04N 2201/3281; H04N 2201/3233; H04N 21/26613; H04N 21/6334; H04N 21/63345; H04H 60/23; H04W 12/106; H04W 88/023; H04W 12/03; H04Q 2213/13339; H04Q 2213/339; G06F 2211/008; G08B 21/0222;

(Continued)

(56) References Cited

U.S. PATENT DOCUMENTS 8,782,774 B1 7/2014 Pahl
9,628,455 B2 4/2017 Ayyadevara (Continued)

*Primary Examiner* — Edward Zee
*Assistant Examiner* — Leynna Truvan
(74) *Attorney, Agent, or Firm* — Moore & Van Allen PLLC; Gabrielle M. Carlini

(57) ABSTRACT

Embodiments of the invention relate to systems, methods, and computer program products for encryption-aware verification in a decentralized network, the invention including encrypting a message at a first node; generating a first encryption-aware verification token ("EAT") associated with the message; performing a first encryption-aware verification process at a second node; verifying the first EAT; and decrypting the message. In some embodiments, the invention further includes generating a second EAT at the second node; performing a second encryption-aware verification process at a third node; verifying the second EAT; and decrypting the message at the third node.

20 Claims, 7 Drawing Sheets

(58) Field of Classification Search
CPC ............ G07F 7/1016; G11B 20/00217; G11B 20/00536; G11B 20/00811; G07B 2017/00895; G07B 2017/00774; G07B 2017/00766; G07B 2017/0075; G07B 2017/00758; G07B 2017/00846; G07B 2017/0087; G06Q 20/3823; G06Q 20/40975; G06Q 20/401; G06Q 20/3829
See application file for complete search history.

(56) References Cited

U.S. PATENT DOCUMENTS

| | | | | |
|---|---|---|---|---|
| 11,044,082 | B2 | 6/2021 | Vermeulen | |
| 11,153,080 | B1 | 10/2021 | Nix | |
| 11,303,632 | B1 | 4/2022 | Mannattil | |
| 2006/0034456 | A1 | 2/2006 | McGough | |
| 2010/0217882 | A1 | 8/2010 | Yang | |
| 2014/0143855 | A1 | 5/2014 | Keoh | |
| 2014/0164776 | A1* | 6/2014 | Hook | G06F 21/6218 713/171 |
| 2015/0288679 | A1 | 10/2015 | Ben-Nun | |
| 2016/0112381 | A1 | 4/2016 | Bhattacharyya | |
| 2017/0237571 | A1 | 8/2017 | Pahl | |
| 2017/0310472 | A1 | 10/2017 | Garcia-Morchon | |
| 2020/0162432 | A1 | 5/2020 | Ludin | |
| 2020/0403978 | A1 | 12/2020 | Allen | |
| 2021/0111881 | A1 | 4/2021 | Migault | |
| 2021/0167963 | A1 | 6/2021 | Autry | |
| 2021/0184842 | A1 | 6/2021 | Nix | |
| 2021/0281395 | A1 | 9/2021 | Narayanaswami | |
| 2021/0367941 | A1 | 11/2021 | McGough | |
| 2022/0337438 | A1 | 10/2022 | Oliver | |
| 2023/0058965 | A1* | 2/2023 | Best | H04L 9/3247 |
| 2023/0421399 | A1* | 12/2023 | Quirk | H04L 9/3239 |
| 2024/0250820 | A1* | 7/2024 | Osborn | H04L 9/30 |

* cited by examiner

ENCRYPTION-AWARE VERIFICATION TOKENS FOR USE IN A DECENTRALIZED DATA SYSTEM

FIELD OF THE INVENTION

The present invention embraces a system for optimized security in a decentralized data system using encryption-aware verification tokens.

BACKGROUND

In systems using next-generation encryption protocols, there is a need for enhanced network security protocols which do not require decryption of message payloads.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for encryption-aware verification in a decentralized network, the invention including: encrypting a message at a first node; generating a first encryption-aware verification token ("EAT") associated with the message; performing a first encryption-aware verification process at a second node; verifying the first EAT; and decrypting the message.

In some embodiments, the invention further includes generating a second EAT at the second node; performing a second encryption-aware verification process at a third node; verifying the second EAT; and decrypting the message at the third node.

In some embodiments, the first encryption-aware verification process includes verifying a digital signature of the first EAT based on a public key of the first node.

In some embodiments, the digital signature of the first EAT is generated based on a private key of the first node.

In some embodiments, the invention further includes identifying the second node based on a routing table of the first node.

In some embodiments, the message includes information identifying a target node.

In some embodiments, the invention further includes decrypting the message at the target node.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
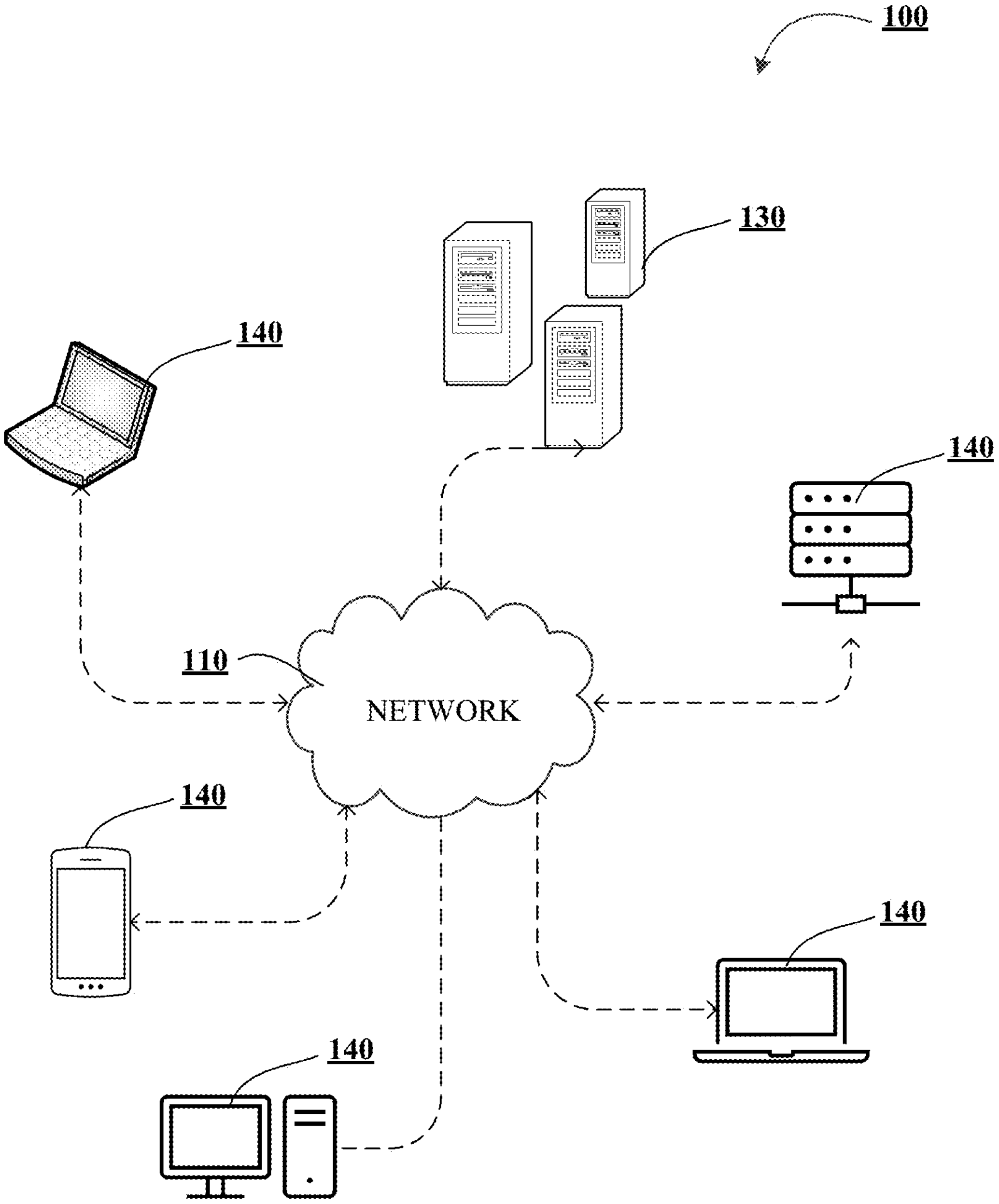
Figure 1B:
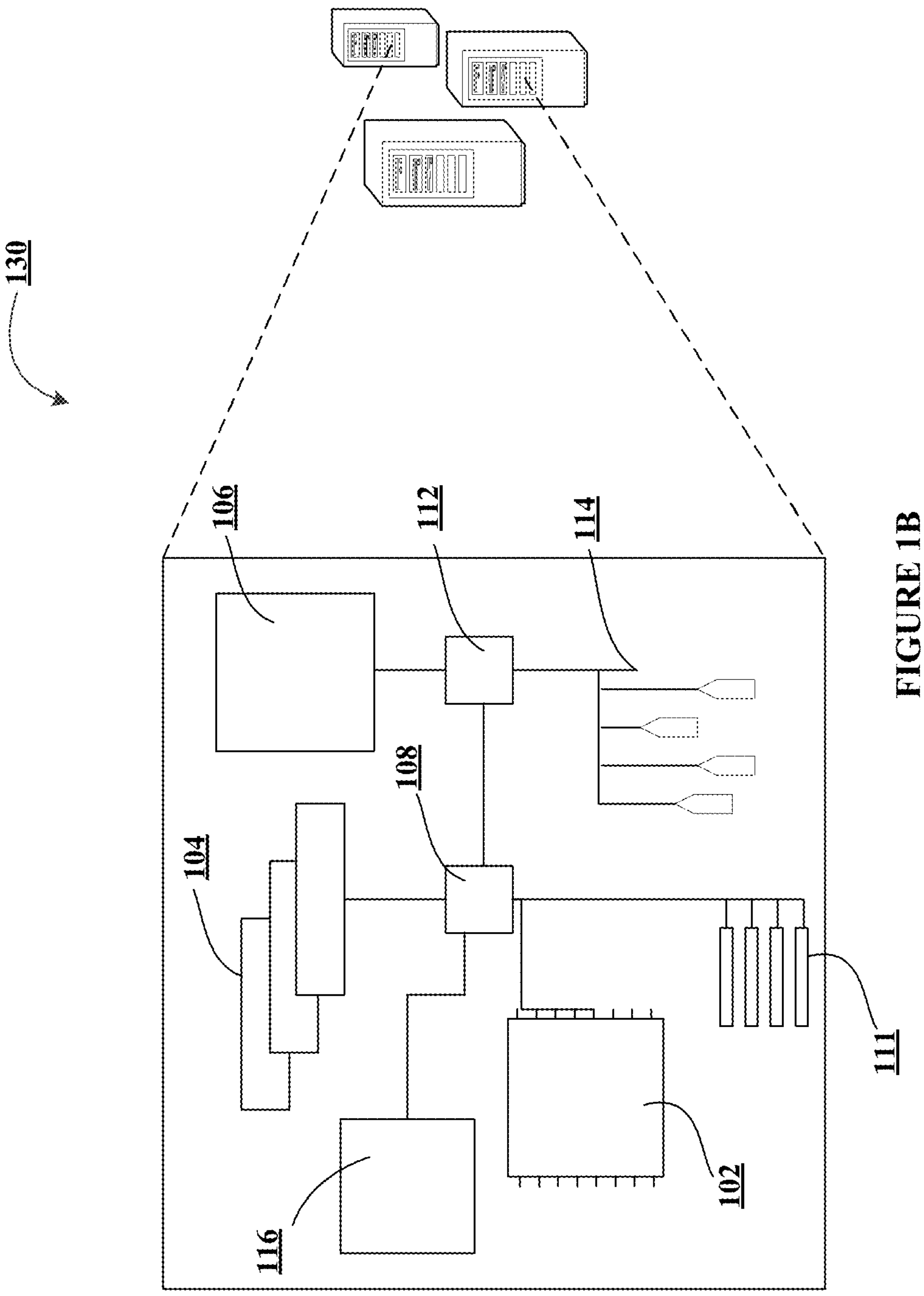
Figure 1C:
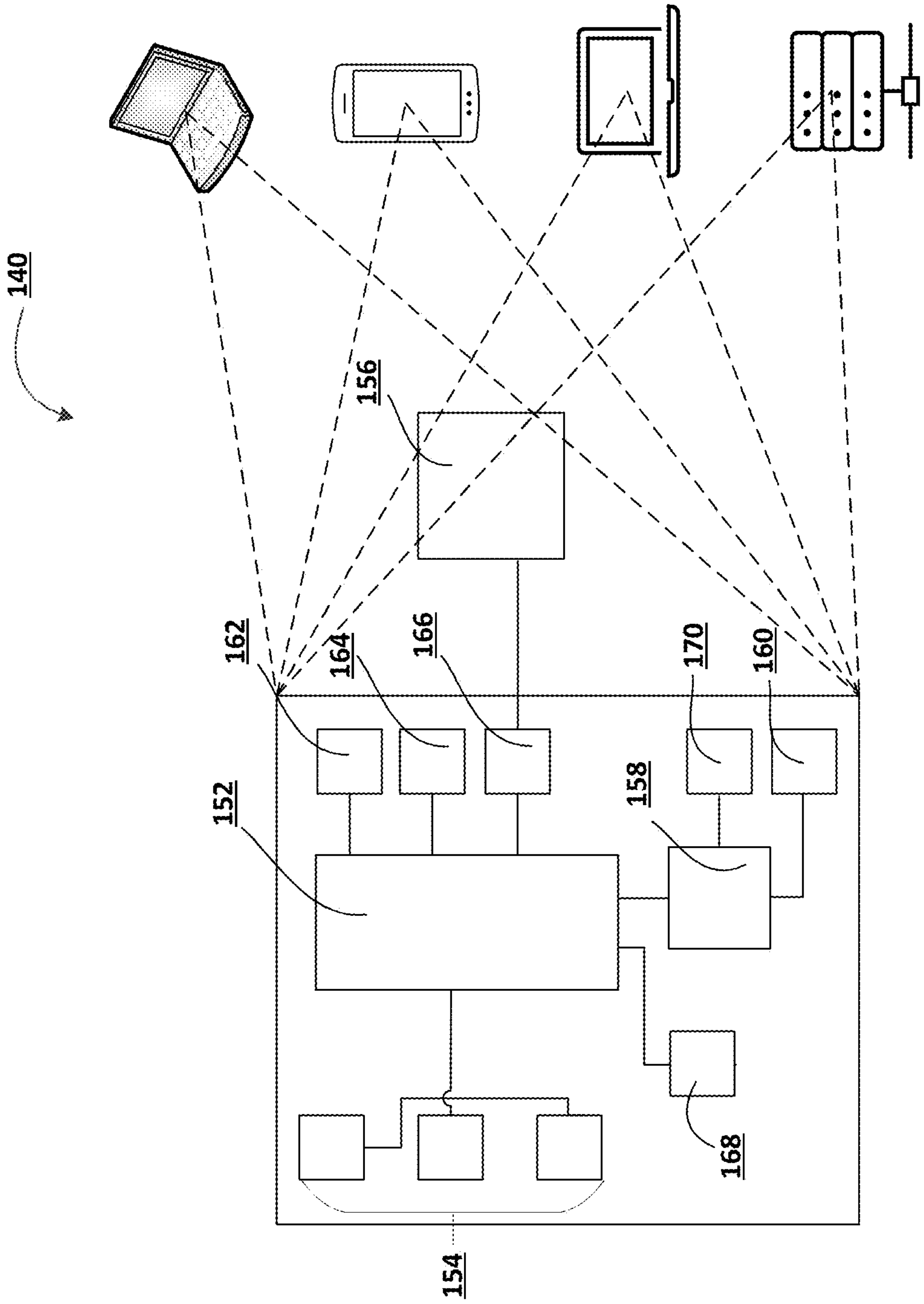
Figure 2A:
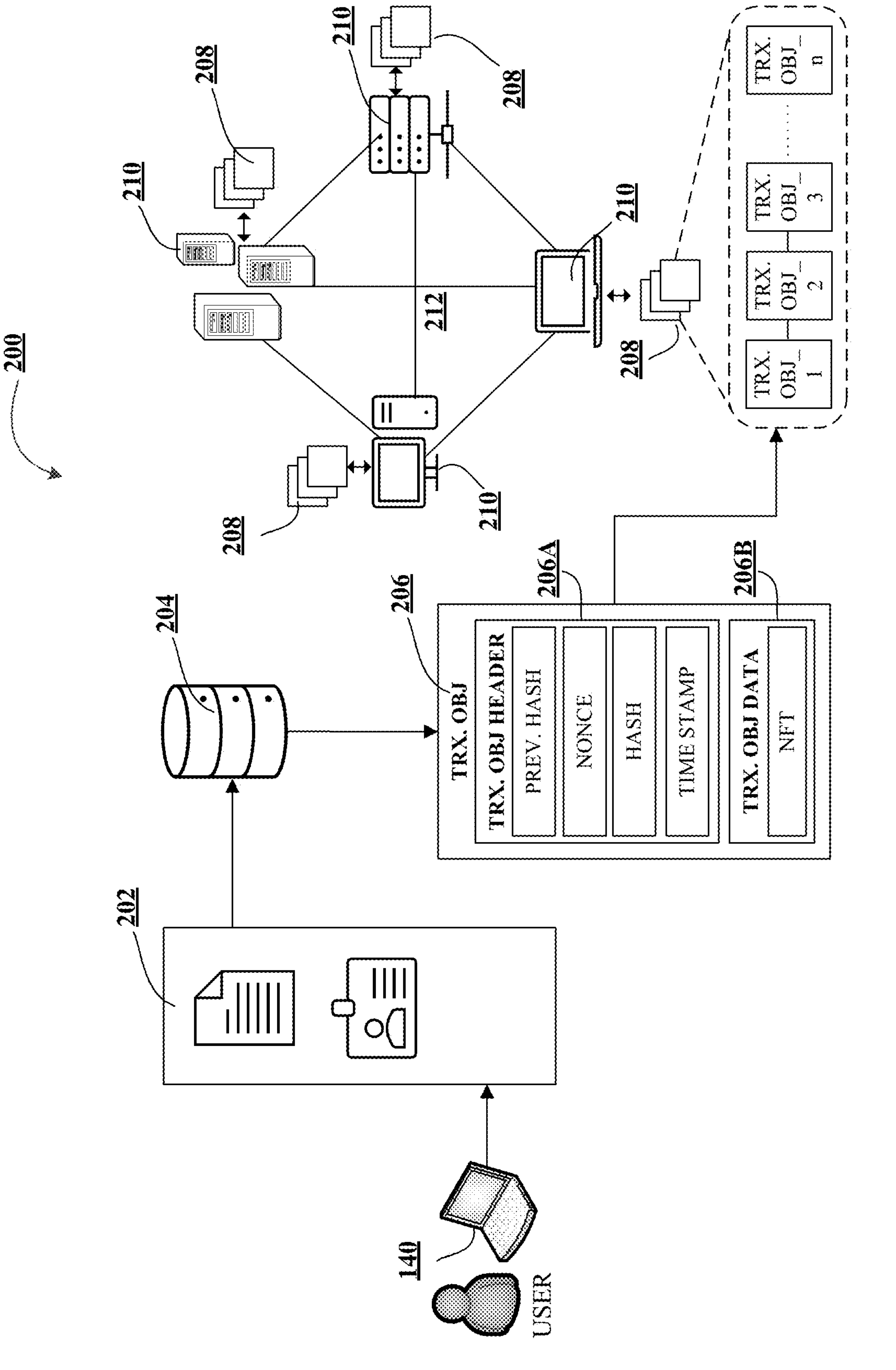
Figure 2B:
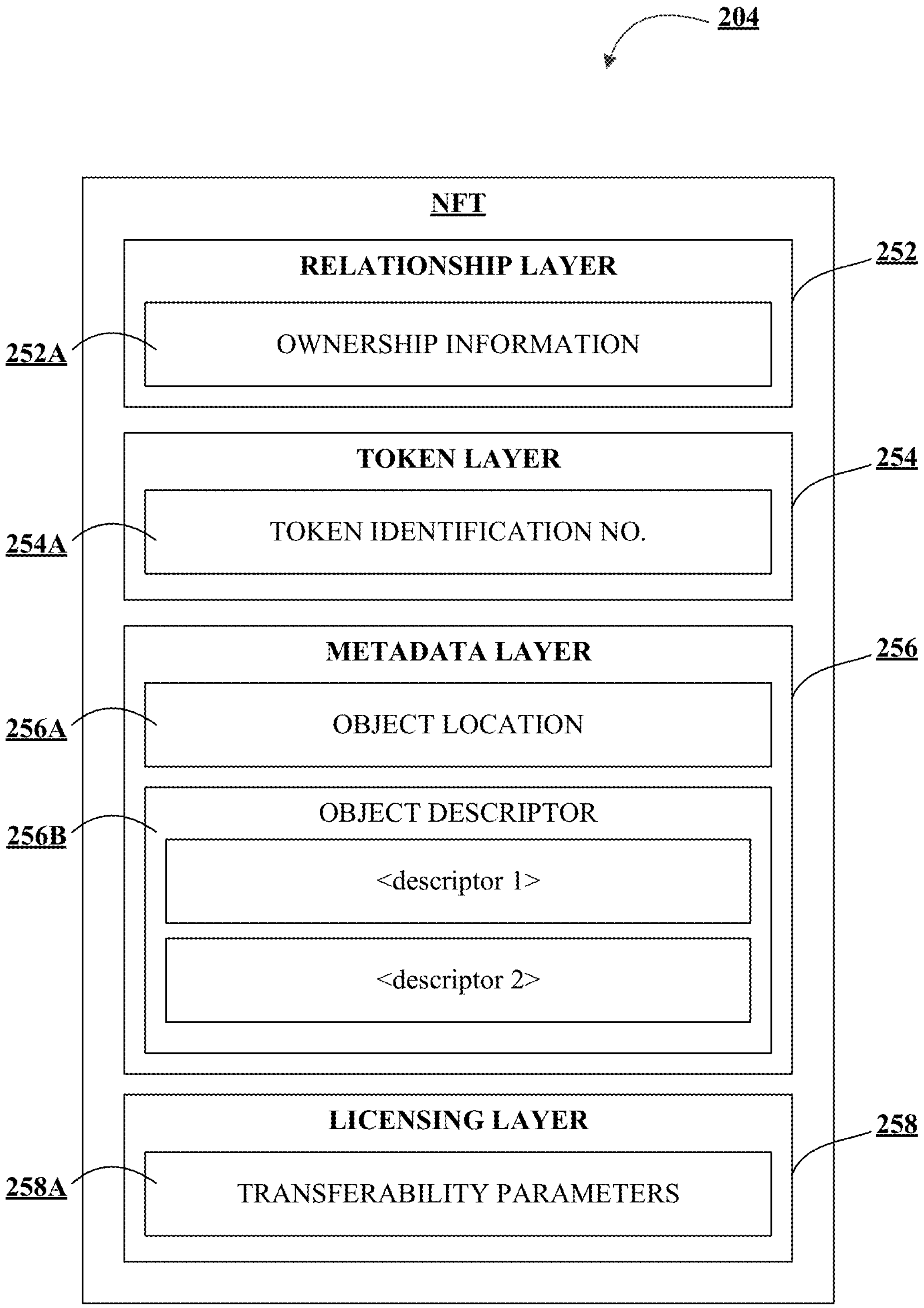
Figure 3:
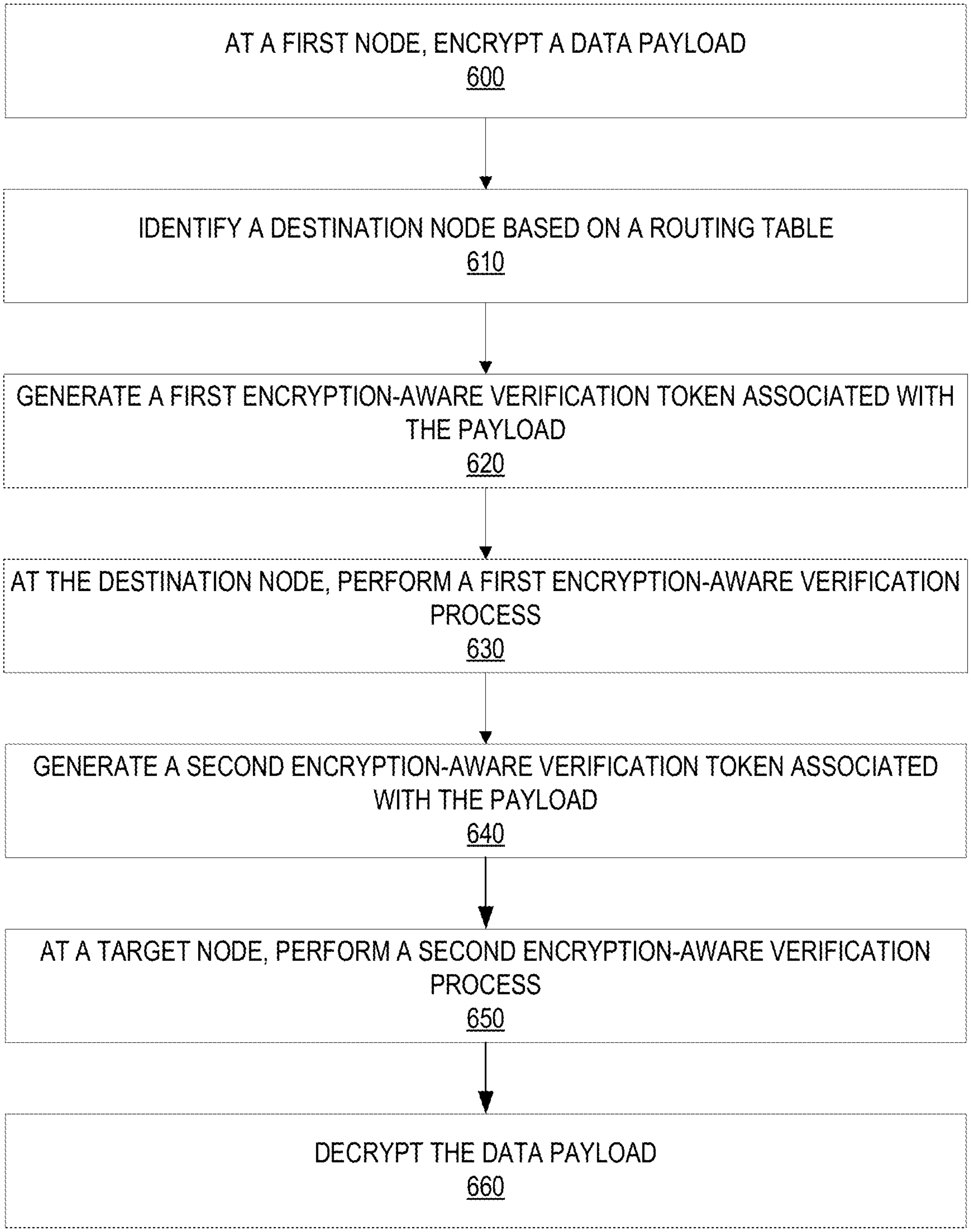
Figure 4:
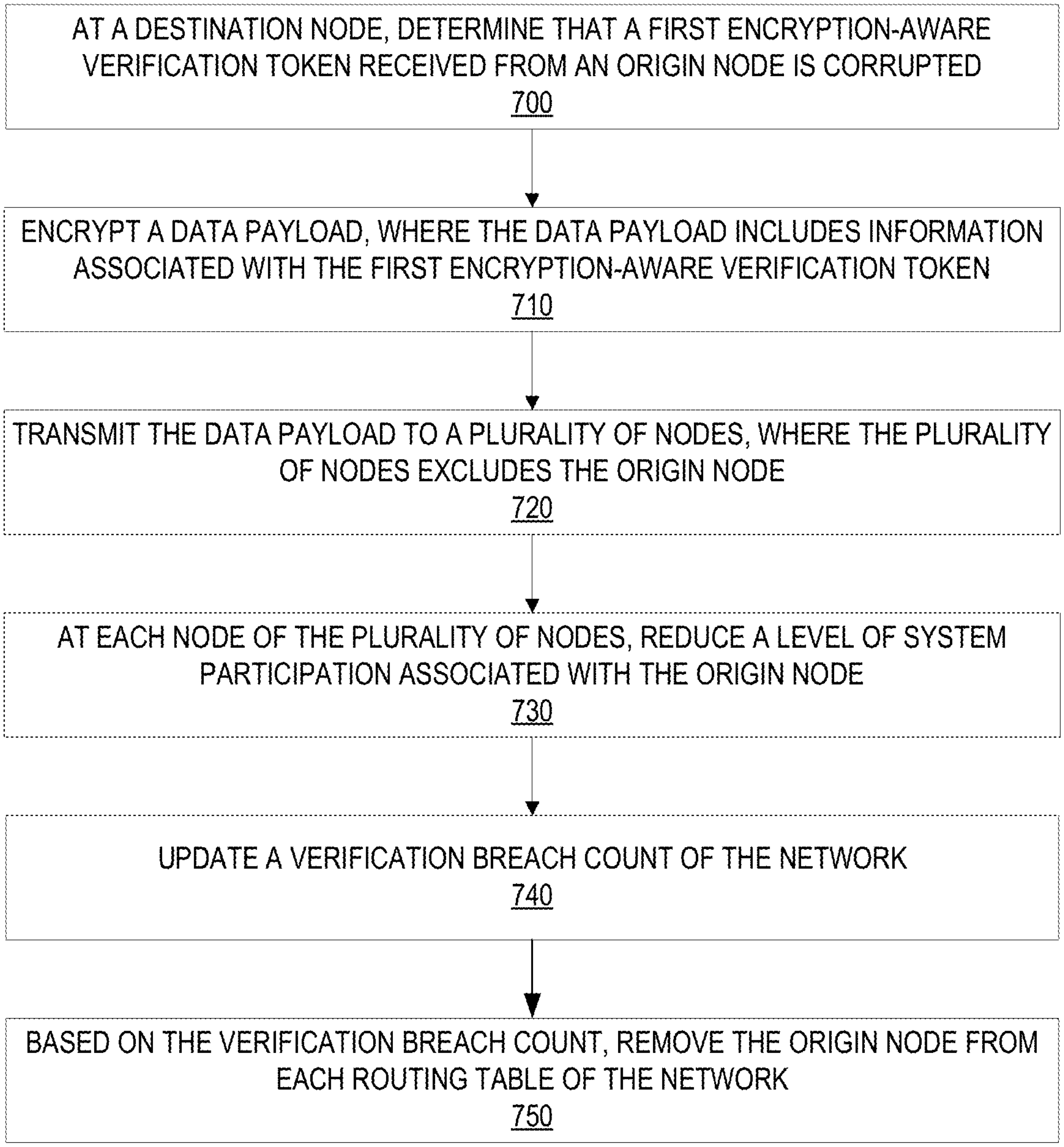

Having thus described embodiments of the invention in general terms, reference will now be made to the accompanying drawings, wherein:

FIG. 1A-1C illustrate technical components of an exemplary distributed computing environment for an encryption-aware verification system, in accordance with an embodiment of the disclosure;

FIG. 2A illustrates an exemplary process of generating an NFT, in accordance with an embodiment of the disclosure;

FIG. 2B illustrates an exemplary NFT, in accordance with an embodiment of the disclosure;

FIG. 3 is a block diagram illustrating a process using the encryption-aware verification system, in accordance with an embodiment of the disclosure; and FIG. 4 is a block diagram illustrating a process using the encryption-aware verification system, in accordance with another embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

As used herein, an "entity" may be any institution employing information technology resources and particularly technology infrastructure configured for managing electronic workflows. Typically, these workflows can be related to the people who work for the organization, its products or services, the customers or any other aspect of the operations of the organization. As such, the entity may be any institution, group, association, financial institution, establishment, company, union, authority or the like, employing information technology resources for managing electronic workflows.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "production environment" includes various components used to deploy, implement, access, and use, a given application as that application is intended to be used. In various embodiments, production environments include multiple production environment components that are combined; communicatively coupled; virtually and/or physically connected; and/or associated with one another, to provide the production environment implementing the application. In some embodiments, the production environment components making up a given production environment can include, but are not limited to, one or more computing environments used to implement the application in the production environment such as a data center, a cloud computing environment, and/or one or more other computing environments in which one or more components and/or services used by the application in the production environment are implemented; one or more computing systems or computing entities used to implement the application in the production environment; one or more supervisory or control systems, such as hypervisors, used to implement the application in the production environment; one or more communications channels used to implement the application in the production environment; one or more access control systems, such as firewalls and gateways, used to implement the application in the production environment; one or more routing systems, such as routers and switches, used to implement the application in the production environment; one or more communications endpoint proxy systems, such as load balancers or buffers, used to implement the application in the production environment; one or more traffic or access control systems used to implement the application in the production environment; one or more secure communication protocols and/or endpoints, such as Secure Sockets Layer (SSL) protocols, used to implement the application in the production environment; one or more databases used to implement the application in the production environment; one or more internal or external services used to implement the application in the production environment; one or more backend systems, such as backend servers or other hardware used to implement the application in the production environment; one or more software systems used to implement the application in the production environment; and/or any other components making up an actual production environment in which an application is to be deployed, implemented, accessed, and run, as discussed herein, and/or as known in the art at the time of filing, and/or as developed after the time of filing.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making a prediction about a dataset. Machine learning algorithms contemplated, described, and/or used herein include supervised learning (e.g., using logistic regression, using back propagation neural networks, using random forests, decision trees, and the like), unsupervised learning (e.g., using an Apriori algorithm, using K-means clustering), semi-supervised learning, reinforcement learning (e.g., using a Q-learning algorithm, using temporal difference learning), and/or any other suitable machine learning model types. Each of these types of machine learning algorithms can implement any of one or more of a regression algorithm (e.g., ordinary least squares, logistic regression, stepwise regression, multivariate adaptive regression splines, locally estimated scatterplot smoothing, and the like), an instance-based method (e.g., k-nearest neighbor, learning vector quantization, self-organizing map, and the like), a regularization method (e.g., ridge regression, least absolute shrinkage and selection operator, elastic net, and the like), a decision tree learning method (e.g., classification and regression tree, C4.5, chi-squared automatic interaction detection, decision stump, random forest, multivariate adaptive regression splines, gradient boosting machines, and the like), a Bayesian method (e.g., naïve Bayes, averaged one-dependence estimators, Bayesian belief network, and the like), a kernel method (e.g., a support vector machine, a radial basis function, a linear analysis, and the like), a clustering method (e.g., k-means clustering, expectation maximization, and the like), an associated rule learning algorithm, an artificial neural network model (e.g., a Perceptron method, a back-propagation method, a Hopfield network method, a self-organizing map method, a learning vector quantization method, and the like), a deep learning algorithm (e.g., a deep belief network method, a convolution network method, a stacked auto-encoder method, and the like), a dimensionality reduction method (e.g., principal component analysis, partial least squares regression, multidimensional scaling, projection pursuit, and the like), an ensemble method (e.g., boosting, bootstrapped aggregation, stacked generalization, gradient boosting machine method, random forest method, and the like), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Because next-generation encryption protocols (such as TLS v1.3) encrypt handshake messages as well as message payloads, decrypting this data to verify network traffic can greatly increase the latency of the system. Thus, there is a need to differentiate between legitimate and malicious traffic in a decentralized data system without requiring decryption of any aspect of the traffic. The present invention is a novel system and protocol for decentralized communication, which generates non-fungible "encryption-aware tokens" for data transmission. The system then uses the encryption-aware tokens for multi-dimensional traffic verification, including verifying network attributes, system attributes, and data attributes.

The encryption-aware verification system may comprise a hybrid structured-unstructured overlay network which enables encryption aware traffic verification and immediate isolation of malicious nodes. The verification is encryption-aware because without decrypting the payload, multiple aspects of the data being transmitted can be verified by the destination node. This architecture works on the design principle of taking away the responsibility of verification of data in the network from being solely upon the agents/nodes. It is shared by the network data itself by means of a schema for novel protocol for decentralized communication which uses an encryption-aware token ("EAT") for data transmission. The system may further be used to slow down a degree of adverse impact of the potentially malicious nodes by decreasing their rate of participation using intelligent updates to data structures using the novel protocol. This may be achieved via a configurable threshold for the number of invalid tokens a node can send before it is marked as malicious and kicked out. In some embodiments, the system further includes constant time isolation of malicious nodes by means of message flooding as part of the unstructured overlay of the hybrid overlay architecture.

FIGS. 1A-1C illustrate technical components of an exemplary distributed computing environment 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2A illustrates an exemplary process of creating an NFT 200, in accordance with an embodiment of the invention. As shown in FIG. 2A, to create or "mint" an NFT, a user (e.g., NFT owner) may identify, using a user input device 140, one or more objects or values 202 that the user wishes to mint as an NFT. In the present invention, the objects 202 may comprise any data or information associated with the container image retention system, including a container image. These objects 202 are then digitized into a proper format to produce an NFT 204. The NFT 204 may be a multi-layered documentation that identifies the objects 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce-a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process.

As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the object and/or the NFT 204, and their relationship to one another. For example, if the NFT 204 is transferred by user U1 to a user U2, the relationship between U1 and U2 as a transfer-transferee is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identification number 254A that is used to identify the NFT 204. The metadata layer 256 may include at least a file location 256A and a file descriptor 256B. The file location 256A may provide information associated with the specific location of the object 202. Depending on the conditions listed in the smart contract underlying the distributed ledger 208, the object 202 may be stored on-chain, i.e., directly on the distributed ledger 208 along with the NFT 204, or off-chain, i.e., in an external storage location. The file location 256A identifies where the object 202 is stored. The file descriptor 256B may include specific information associated with the source itself 202. For example, the file descriptor 256B may include information about the supply, authenticity, lineage, provenance of the object 202. The licensing layer 258 may include any transferability parameters 258B associated with the NFT 204, such as restrictions and licensing rules associated with purchase, sale, and any other types of transfer of the object 202 and/or the NFT 204 from one person to another. Those skilled in the art will appreciate that various additional layers and combinations of layers can be configured as needed without departing from the scope and spirit of the invention.

FIG. 3 is a high-level process flow diagram illustrating a process using the encryption-aware verification system, in accordance with one embodiment of the present disclosure. The process flow may begin at block 600, where a message is encrypted at a first node (i.e. an origin node). In some embodiments, the message may be structured using an encryption-aware protocol. The protocol may comprise a message schema, where each message structured using the schema includes network data (i.e. a source IP address, a source port number, a destination IP address, a destination port number, a communication protocol, and/or the like), host data (e.g., data related to the origin node), payload data (e.g., an encrypted payload of the message), regional data (e.g., data privacy guidelines associated with a location of one or more nodes in the network), and message-specific data (e.g., a message type, an origin node ID, a destination node ID, a source node ID, a target node ID, and/or a timestamp). In some embodiments, the payload data may be encrypted using an asymmetric encryption algorithm using a public key of the target node as a secret key.

The process flow may then continue to block 610, where the origin node identifies a destination node for the message based on a routing table of the origin node. For example, if the origin node is node 0 in the network and the target node is node 3 in the network, node 0 may identify node 2 as the closest neighbor to node 3 within the origin node's routing table. Thus, the message scheme may indicate that the origin node is node 0, the source node is node 0, the destination node is node 2, and the target node is node 3. The process flow may then continue to block 620, where the origin node may generate a first encryption-aware verification token ("EAT") associated with the payload data. In some embodiments, the EAT may be an NFT as described in greater detail with respect to FIGS. 2A and 2B. The EAT may comprise a header, an encoded message, and a digital signature. The header may comprise an encoded string containing information about a digital signature algorithm ("DSA") used to generate the digital signature. The encoded message may comprise the data from the message schema described with respect to block 600. The digital signature may comprise a cryptographic hash value generated using a private key of the origin node. After the EAT is generated, it may then be transmitted to the destination node.

The process flow may then continue to block 630, where the destination node may receive the EAT and perform a first encryption-aware verification process. In some embodiments, the encryption-aware verification process may comprise verifying the digital signature of the EAT using a public key of the origin node. Specifically, the destination node may decode the EAT header and identify the DSA used to generate the digital signature. The destination node may then use the DSA to generate a cryptographic hash value, using a public key of the origin node. The destination node may then determine that the generated cryptographic hash value matches the hash value of the EAT and that the EAT is verified.

The process flow may then continue to block 640, where the destination node may generate a second encryption-aware verification token ("EAT") associated with the payload data. In some embodiments, the destination node may use a routing table to determine a new destination node. In some embodiments, the new destination node may be the target node. The second EAT may contain the same encrypted payload data as the first EAT. Continuing with the above example, where node 2 was the destination node, the second EAT may indicate that the origin node was node 0, the source node was node 2, the target node is node 3, and the destination node is node 3. The second EAT may be digitally signed using a private key of node 2. The second EAT may then be transmitted to the new destination node. If the new destination node is not the target node, the process flow steps of 630 and 640 may iterate until an EAT reaches the target node.

The process flow may then continue to block 650, where the target node receives the second EAT and performs a second encryption-aware verification process. Continuing with the above example, the target node may perform the encryption-aware verification process using a public key of node 2. The process flow may then conclude at block 660, where the target node fully decrypts the payload data.

FIG. 4 is a high-level process flow diagram illustrating a network flooding process using the encryption-aware verification system, in accordance with one embodiment of the present disclosure. The process flow may begin at block 700, where a destination node may determine that a first encryption-aware verification token ("EAT") received from an origin node is corrupted (i.e., that the EAT fails the verification process described with respect to FIG. 3). The process flow may then continue to block 710, where the destination node may encrypt a new payload. The payload may include information associated with the first encryption-aware verification token. In some embodiments, the payload may include encrypted details of all corrupted EATs received by the origin node. The new payload may be encrypted using public keys of all nodes in the network. For example, if the origin node was node 0 and the destination node was node 2, the new payload may indicate that the origin node is node 2, the source node is node 0, and the target node is "i," where "i" represents all nodes in the network other than node 0.

The process flow may then continue to block 720, where the destination node may transmit the payload to a plurality of nodes, where the plurality of nodes excludes the origin node. Then, the process flow may continue to block 730 where each node of the plurality of nodes reduces a level of system participation associated with the origin node. For example, each node may reduce a queue associated with the origin node, thereby reducing the number of payloads which can be received and/or processed from the origin node.

The process flow may then continue to block 740, where each node may update a verification breach count of the origin node. The verification breach count may record the number of times that each node has transmitted a corrupted EAT. Each node may further comprise a configurable verification breach threshold value. If the updated verification breach count of the origin node exceeds the verification breach threshold value, the process flow may continue to block 750, where the origin node is removed from the network. The origin node may be removed from the network by each node updating an associated routing table to remove the origin node from each routing table. In some embodiments, the origin node may be removed from the network for a predetermined period of time. Additionally or alternatively, the origin node may be permanently removed from the network.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for encryption-aware verification in a decentralized network, the system comprising:
- at least one non-transitory storage device; and
- at least one processing device coupled to the at least one non-transitory storage device, wherein the at least one processing device is configured to:
  - encrypt a message at a first node;
  - generate a first encryption-aware verification token ("EAT") associated with the encrypted message at the first node, wherein the first EAT is configured for routing the encrypted message through the decentralized network, wherein the first EAT comprises a nonfungible token recorded on a distributed ledger maintained on at least one authorized node of the decentralized network, the nonfungible token comprising a header, the encrypted message, and a digital signature, and wherein the header comprises an encoded string containing information about a digital signature algorithm used to generate the digital signature;
  - perform a first encryption-aware verification process at a second node, wherein the first encryption-aware verification process comprises verifying network attributes, system attributes, and data attributes without decrypting the encrypted message;
  - verify the first EAT; and
  - decrypt the encrypted message.

2. The system of claim 1, wherein the at least one processing device is further configured to: generate a second EAT at the second node;
- perform a second encryption-aware verification process at a third node;
- verify the second EAT; and
- decrypt the encrypted message at the third node.

3. The system of claim 2, wherein the at least one processing device is further configured to identify the third node based on a routing table of the second node.

4. The system of claim 1, wherein the first encryption-aware verification process further comprises verifying the digital signature of the first EAT based on a public key of the first node.

5. The system of claim 4, wherein the digital signature of the first EAT is generated based on a private key of the first node.

6. The system of claim 1, wherein at least one processing device is further configured to identify the second node based on a routing table of the first node.

7. The system of claim 1, wherein the message comprises information identifying a target node.

8. The system of claim 7, wherein the at least one processing device is further configured to decrypt the encrypted message at the target node.

9. The system of claim 7, wherein the second node is an intermediate node between the first node and the target node, and wherein the first encryption-aware verification process at the second node verifies the first EAT without decrypting the encrypted message, and wherein the encrypted message is decrypted only at the target node.

10. A computer program product for encryption-aware verification in a decentralized network, the computer program product comprising at least one non-transitory computer-readable medium having computer-readable program code portions embodied therein, the computer-readable program code portions comprising:
- an executable portion configured to encrypt a message at a first node;
- an executable portion configured to generate a first encryption-aware verification token ("EAT") associated with the encrypted message at the first node, wherein the first EAT is configured for routing the encrypted message through the decentralized network, wherein the first EAT comprises a nonfungible token recorded on a distributed ledger maintained on at least one authorized node of the decentralized network, the nonfungible token comprising a header, the encrypted message, and a digital signature, and wherein the header comprises an encoded string containing information about a digital signature algorithm used to generate the digital signature;
- an executable portion configured to perform a first encryption-aware verification process at a second node, wherein the first encryption-aware verification process comprises verifying network attributes, system attributes, and data attributes without decrypting the encrypted message;
- an executable portion configured to verify the first EAT; and
- an executable portion configured to decrypt the encrypted message.

11. The computer program product of claim 10, further comprising:
- an executable portion configured to generate a second EAT at the second node;
- an executable portion configured to perform a second encryption-aware verification process at a third node;
- an executable portion configured to verify the second EAT; and
- an executable portion configured to decrypt the encrypted message at the third node.

12. The computer program product of claim 10, wherein the first encryption-aware verification process further comprises verifying a digital signature of the first EAT based on a public key of the first node.

13. The computer program product of claim 11, wherein the digital signature of the first EAT is generated based on a private key of the first node.

14. The computer program product of claim 10, further comprising an executable portion configured to identify the second node based on a routing table of the first node.

15. The computer program product of claim 10, wherein the message comprises information identifying a target node.

16. The computer program product of claim 15, further comprising an executable portion configured to decrypt the encrypted message at the target node.

17. A computer-implemented method for encryption-aware verification in a decentralized network, the method comprising:

encrypting a message at a first node;

generating a first encryption-aware verification token ("EAT") associated with the encrypted message at the first node, wherein the first EAT is configured for routing the encrypted message through the decentralized network, wherein the first EAT comprises a nonfungible token recorded on a distributed ledger maintained on at least one authorized node of the decentralized network, the nonfungible token comprising a header, the encrypted message, and a digital signature, and wherein the header comprises an encoded string containing information about a digital signature algorithm used to generate the digital signature;

performing a first encryption-aware verification process at a second node, wherein the first encryption-aware verification process comprises verifying network attributes, system attributes, and data attributes without decrypting the encrypted message;

verifying the first EAT; and decrypting the encrypted message.

18. The computer-implemented method of claim 17, further comprising:

generating a second EAT at the second node;

performing a second encryption-aware verification process at a third node;

verifying the second EAT; and decrypting the encrypted message at the third node.

19. The computer-implemented method of claim 17, wherein the first encryption-aware verification process further comprises verifying a digital signature of the first EAT based on a public key of the first node.

20. The computer-implemented method of claim 19, wherein the digital signature of the first EAT is generated based on a private key of the first node.

* * * * *